US006027589A

United States Patent [19]

Kato et al.

[11] Patent Number: 6,027,589

[45] Date of Patent: Feb. 22, 2000

[54] WATERPROOFING METHOD FOR AN INTRODUCTION PORTION OF A COVERED CONDUCTOR

[75] Inventors: Tetsuo Kato; Akira Shinchi; Tetsuro Ide, all of Shizuoka-ken, Japan

[73] Assignee: Yazaki Corporation, Tokyo, Japan

[21] Appl. No.: 09/082,537

[22] Filed: May 21, 1998

[30] Foreign Application Priority Data

May 22, 1997 [JP] Japan .................................... 9-132432

[51] Int. Cl.[7] ........................................................ B32B 31/16

[52] U.S. Cl. .................... 156/73.2; 156/73.1; 156/308.2; 156/309.6

[58] Field of Search .................................. 156/73.1, 73.2, 156/308.2, 309.6, 580.1, 580.2; 264/442, 443, 445

[56] References Cited

U.S. PATENT DOCUMENTS 3,282,544 11/1966 Brattberg .................................. 248/56
3,676,744 7/1972 Pennypacker ............................. 317/99
5,234,185 8/1993 Hoffman et al. .......................... 248/56
5,939,674 8/1999 Jibe et al. ................................ 174/59

FOREIGN PATENT DOCUMENTS 50-54591 5/1975 Japan .
2320821 7/1998 United Kingdom .
2321346 7/1998 United Kingdom .

*Primary Examiner*—James Sells
*Attorney, Agent, or Firm*—Finnegan, Henderson, Farabow, Garrett & Dunner, L.L.P.

[57] ABSTRACT

An introduction portion of a resin molded product for introducing a covered conductor is waterproofed in a following method. First, an annular waterproofing member which can be fused with the introduction portion and has a compatibility with its covering portion is attached to an outside periphery of the covered conductor corresponding to the introduction portion. Second, by heating the introduction portion, the waterproofing portion and covering portion are melted together and the waterproofing member and introduction portion are fused together with each other. This method ensures a cheap cost and a high waterproofing performance, and is applicable for various types and sizes of wires.

5 Claims, 7 Drawing Sheets

WATERPROOFING METHOD FOR AN INTRODUCTION PORTION OF A COVERED CONDUCTOR

BACKGROUND OF THE INVENTION

This invention relates to a waterproofing method for an introduction portion of a covered conductor such as a covered wire or the like and more particularly to waterproofing method for making waterproof an introduction portion of a waterproof connector or a wiring device such as an electric connection box.

FIGS. 1A, 1B show a conventional example of waterproofing structure of an introduction portion of a waterproof connector (see Japanese Unexamined Patent Application No. Sho50-54591).

According to this waterproof structure, wires 2 (covered wires, hereinafter same as this) are pinched between upper and lower rubber plugs 1 which are separated as shown in FIG. 1A such that each wire is fit to each groove 3 of the rubber plugs 1, and then as shown in FIG. 2B, the rubber plugs 1 are pressed into a concave portion 5 of the housing 4. According to the conventional waterproof structure, a plurality of wires 2 can be all treated in waterproof condition.

However, in this conventional waterproof structure, a procedure for fitting the rubber plugs 1 into the housing 4 is troublesome. Further, it is necessary to produce the rubber plugs 1 by preparing a mold die depending on a number of poles, so that the production cost rises.

Further, it is hard to fit the two rubber plugs 1 such that there is no gap between their mating faces 1*a* (see FIG. 1B). Thus, the waterproofing performance is likely to drop at the mating faces 1*a*.

SUMMARY OF THE INVENTION

Accordingly the present invention has been made to solve the above problem and it is therefore an object of the invention to provide a waterproofing structure of an introduction portion having a high waterproofing performance despite a cheap production cost.

To achieve the above object, according to a first aspect of the invention, there is provided a waterproofing method for waterproofing an introduction portion of a covered conductor, the covered conductor having a conductor and a covering portion made of resin for covering an outside periphery of the conductor, the covered conductor being introduced from the introduction portion of resin molded product, the waterproofing method comprising the steps of:

attaching an annular waterproofing member to an outside periphery of the covering portion at the introduction portion, the waterproofing member being capable of being fused together with the introduction portion and having a compatibility with the covering portion; and heating the introduction portion so that the waterproofing member and the covering portion are melted together and then the waterproofing member and the introduction portions are fused together with each other.

According to this method, the annular waterproofing member is attached to the outside periphery of the covered conductor and then the introduction portion is heated. When the introduction portion is heated, the waterproofing portion and covering portion are melted together so that they are integrated and then the waterproofing member and the introduction portion of the resin molded product are fused together with each other.

As a result, the gap between the introduction portion and covered wire can be completely sealed so as to ensure a high waterproofing performance. Further, only by attaching the annular waterproofing member to the covered conductor and heating, the waterproofing treatment can be attained easily, thereby production cost being reduced.

According to a second aspect of the invention, there is provided a waterproofing method according to the aforementioned first aspect, wherein the covered conductor is a covered wire; the resin molded product is a resin connector comprising a cover and a housing;

the housing has the introduction portion containing the waterproofing groove portion in which the waterproofing member and the covered wire are to be inserted;

the cover has a waterproofing protrusion for covering the waterproofing groove portion and pressing the waterproofing member in the waterproofing groove portion; and the introduction portion is subjected to ultrasonic vibration with the waterproofing groove portion being covered with the cover, so that the waterproofing member and covering portion are melted together and then the waterproofing member and an inside wall of the waterproofing groove portion are fused together with each other.

According to this waterproofing method, the annular waterproofing member is attached to the outside periphery of the covered wire and then the covered wire and waterproofing member are inserted into the waterproofing groove portion. Then, by covering the waterproofing groove portion with the cover, the annular waterproofing member and covered wire are pressed against the inside wall of the waterproofing groove portion by the waterproofing protrusions. By applying ultrasonic vibration to the introduction portion with this condition, the waterproofing member and covering portion are melted together so that they are integrated, and then the waterproofing member and the inside wall of the waterproofing groove portion are fused together with each other.

As a result, a high waterproofing performance can be obtained.

According to a third aspect of the invention, there is provided a waterproofing method according to the aforementioned second aspect, wherein the connector incorporates a terminal having a sheet-like terminal portion;

the covered wire is accommodated in the waterproofing groove portion such that the covered wire is overlaid with the terminal portion at the connection portion;

the cover has a connecting protrusion;

the connecting protrusion press the connection portion when the waterproofing groove portion is covered with the cover; and the covering portion of the covered wire is melted and removed at the connection portion when the introduction portion is subjected to ultrasonic vibration, so that the terminal portion is conductively connected to the conductor.

According to this waterproofing method, the annular waterproofing member is attached to the outside periphery of the covered wire and together with the covered wire, the waterproofing member is inserted into the waterproofing groove portion. Next by covering the waterproofing groove portion with the cover, the annular waterproofing member and covered wire are pressed against the inside wall of the waterproofing groove portion by the waterproofing grooves. At the same time, the connection portion in which the terminal portion is overlaid with the covered wire is pressed by the connecting protrusions of the cover. By applying ultrasonic vibration to the housing with this condition, the covering portion of the covered wire is melted and removed so that the wires are conductively connected to the terminal portion through the connecting protrusions. Further, the waterproofing member and covering portion are melted together so that they are integrated, and then the waterproofing member and inside wall of the waterproofing groove portion are fused together with each other.

As a result, a high waterproofing performance can be obtained. Further, as it is possible to carry out connection between the terminal portion and covered wire, and the waterproofing treatment at the same time, the production cost thereof can be reduced.

According to a fourth aspect of the invention, there is provided a waterproofing method according to the aforementioned first aspect, wherein the covered conductor comprised two covered wires;

the resin molded products comprised a pair of resin chips for pinching the covered wires such that they are overlaid at the connection portion, each of the resin chips having the introduction portions for introducing the covered wires;

each of the resin chips having a main fusing portion which is fused with a mating resin chip across the connection portion so as to seal the connection portion and auxiliary fusing portions which are provided on each of the introduction portions and subjected to ultrasonic vibration so as to be fused together with the covering portion of the covered wire introduced from the main fusing portion; and the covering portion is melted and removed so that the covered wires are conductively connected to each other by applying a pressure outside the resin chips when the connection portion is subjected to ultrasonic vibration while being pinched by the pair of the resin chips.

According to this waterproofing method, the two covered wires are overlaid at the connection portion and the overlaid portions are pinched by a pair of the resin chips. At this time, the connection portion is pinched between the main fusing portions and the covered wires are introduced from between the auxiliary fusing portions of the introduction portion. The annular waterproofing member is attached to the outside periphery of the covered wire to be pinched between the auxiliary fusing portions.

Next, by applying ultrasonic vibration to the pair of the resin chips, the covering portions of the connection portion pinched at the main fusing portions are melted and removed, so that the conductors are conductively connected to each other. Between the auxiliary fusing portions, the waterproofing member and covering portion are melted together so that they are integrated, and then the waterproofing member and auxiliary fusing portion are fused together with each other.

As a result, the connection portion can be sealed so that a high waterproofing performance can be obtained.

According to a fifth aspect of the invention, there is provided a waterproofing method according to the aforementioned fourth aspect, wherein each of the auxiliary fusing portions of one of the resin chips is formed in a convex form having a wire accommodating groove for accommodating each of the covered wires;

each of the auxiliary fusing portions of the other of the resin chips is formed in a concave form which has a wire accommodating groove for accommodating each of the covered wires and is fit to each of the auxiliary fusing portions of the one resin chip; and the waterproofing member and covered wire are pinched between the auxiliary fusing portions of the one and the other resin chips.

According to this waterproofing method, the covered wire in which the annular waterproofing member is attached to the outside periphery thereof is inserted and accommodated in the wire accommodating groove of one of the auxiliary fusing portions and then the pair of the resin chips are fit to each other. As a result, the covered wire is inserted and accommodated in the wire accommodating groove of the auxiliary fusing portion of the mating resin chip. In this case, the area in which the waterproofing member will be fused with the auxiliary fusing portion is increased so that both of them are uniformly fused together with each other.

DESCRIPTION OF THE PREFERRED EMBODIMENTS

First Embodiment

Hereinafter the embodiment of the waterproofing method the present invention will be described with reference to the accompanying drawings.

Figure 1A:
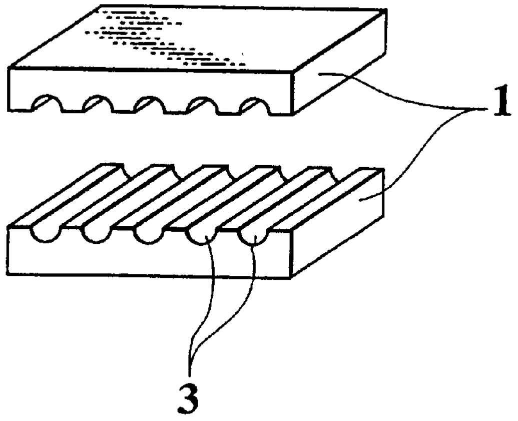
FIG.1A PRIOR ART
FIG. 1A is a perspective view of rubber plugs of a conventional waterproofing connector.
Figure 1B:
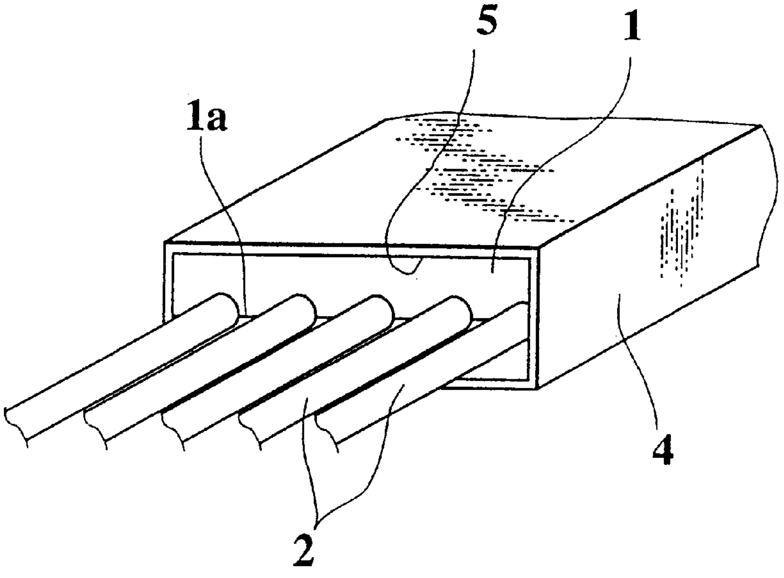
FIG.1B PRIOR ART
FIG. 1B is a perspective view of the conventional waterproofing connector.
Figure 2A:
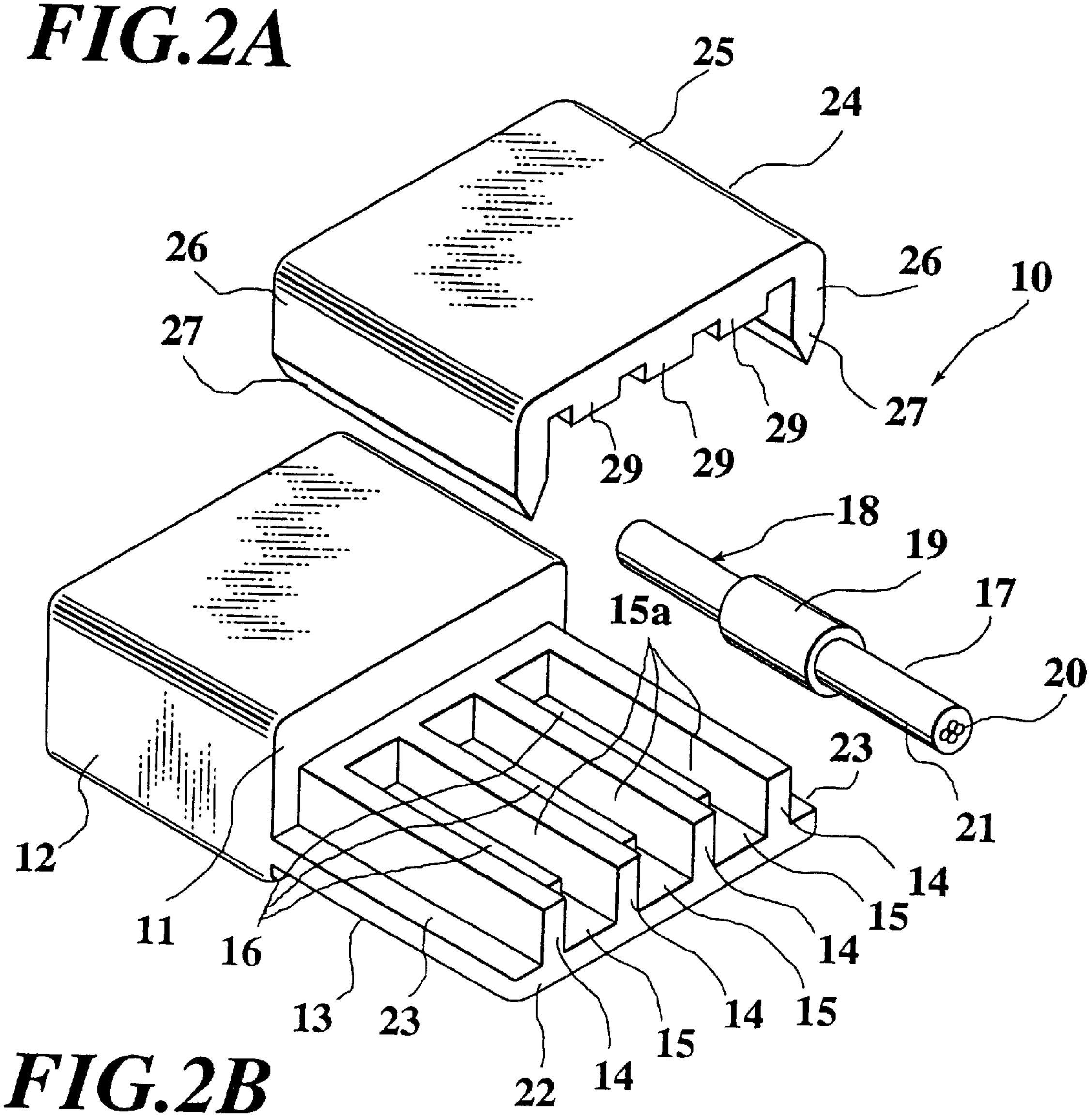
FIG. 2A is a perspective view of a connector according to a first embodiment to which the waterproofing method of the resent invention is applied.
Figure 2B:
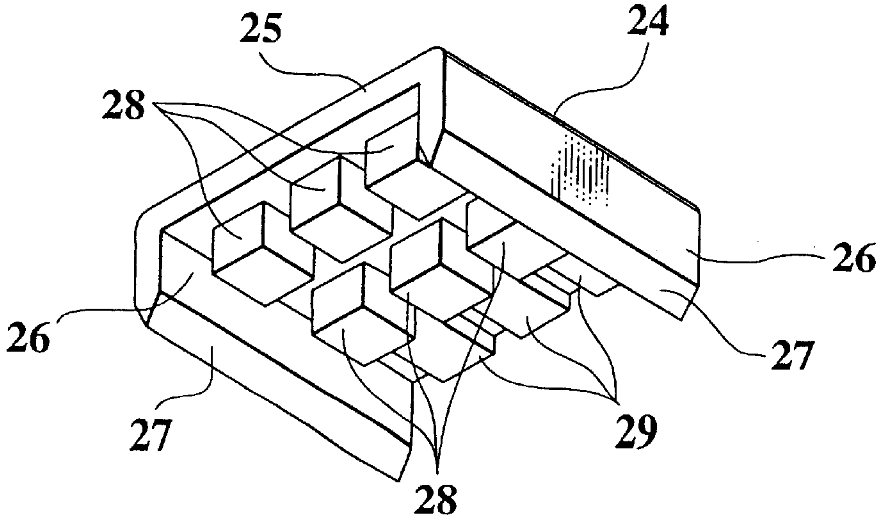
FIG. 2B is a perspective view showing a rear side of a connector cover according to a first embodiment to which the waterproofing method of the present invention is applied.
Figure 3A:
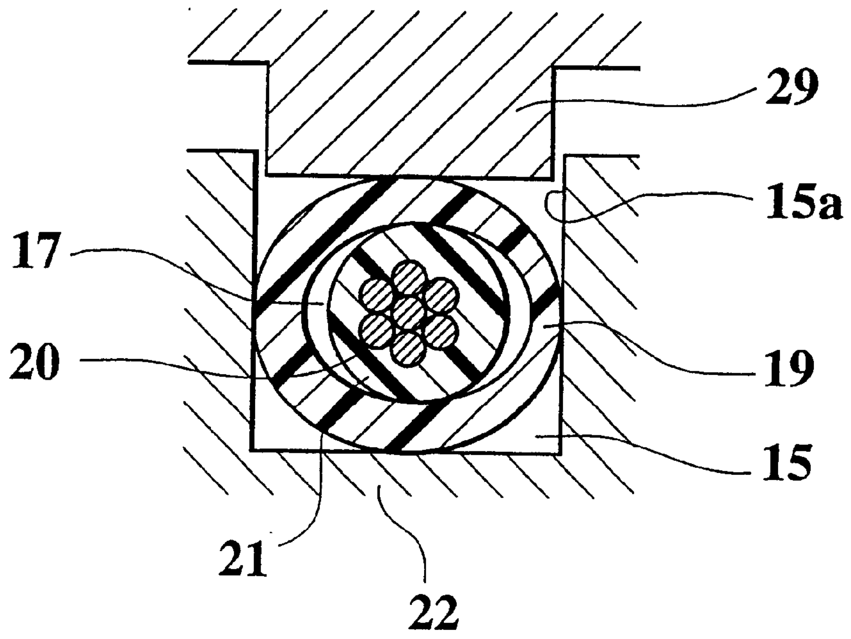
FIG. 3A is a sectional view showing an introduction portion of the first embodiment before ultrasonic vibration is applied.
Figure 3B:
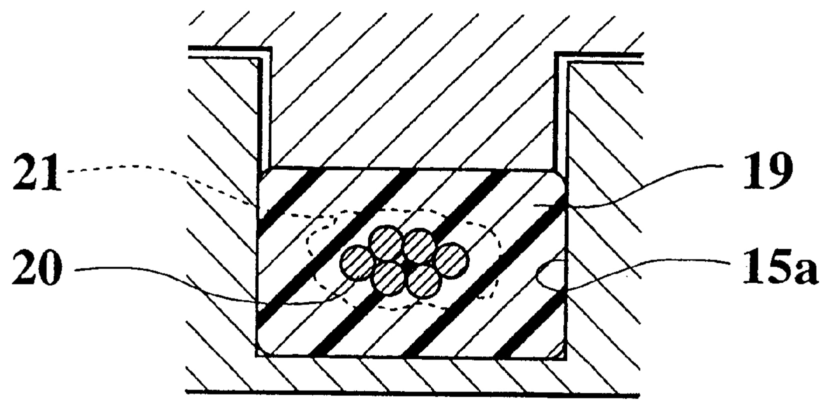
FIG. 3B is a sectional view showing an introduction portion of the first embodiment after ultrasonic vibration is applied.

FIGS. 2A, 2B show a connector 10 to which the waterproofing method of the present invention is applied and FIGS. 3A, 3B show a waterproofing structure of an introduction portion 13.

As shown in FIG. 2A, the connector 10 has a housing 11 and a cover 24. On one end of the housing 11 is formed a hood portion 12 and an introduction portion 13 is formed integrally with the hood portion 12 on the other end thereof. In the introduction portion 13, three waterproofing groove portions 15, 15, 15, sectioned by four partition walls 14, 14, 14, are formed. The waterproofing groove portion has a rectangular cross section and a top and rear end of each waterproofing groove portion are open. In the waterproofing groove portions 15, 15, a sheet-like terminal portion 16 of a terminal incorporated in the housing 11 and a connection portion 18 of an end portion of a covered wire 17 are contained. In the waterproofing groove portion 15, an annular waterproofing member 19 attached to an outside periphery of the covered wire 17 is inserted. The covered wire 17 comprises conductors 20 which act as cores and a covering portion 21 made of resin (vinyl chloride) for covering an outside periphery of the conductors 20. The waterproofing member 19 has a compatibility with the covering portion 21. The waterproofing member 19 is formed of a material which can be fused with an inside wall 15*a* of the waterproofing groove portion 15.

Fusing portions 23, 23 which extend from a bottom wall 22 of the waterproofing groove portion 15 are formed outside of the partition walls 14, 14 of both sides. Fusing portions 27, 27 of the cover 24 come into contact with the fusing portions 23.

The cover 24 for closing an opening of the top of the waterproofing groove portions 15 has a substantially U-shape and has a closing plate portion 25 and a pair of side walls 26 extending in the same direction from both ends of the closing plate portion 25. Fusing portions 27, 27 are provided on sharp edge portions of front ends of the pair of the side walls 26, 26.

As shown in FIG. 2B, connecting protrusions 28 are formed in 2×3 rows corresponding to the waterproofing groove portions 15 on a rear side of the closing plate portion 25 of the cover 24. The connecting protrusions 28 press the terminal portions 16 incorporated in the waterproofing groove portions 15 and the connection portions 18 of the covered wires 17 against the bottom wall 22 of the waterproofing groove portions 15.

At rear ends of the cover 24 corresponding to the waterproofing groove portions 15 are formed three waterproofing protrusions 29. The waterproofing protrusions 29 are located adjacent to the connecting protrusions 28. The waterproofing protrusions 29 press the waterproofing members 19 inserted together with the covered wires 17 in the waterproofing groove portions 15 against the bottom wall 22 of the waterproofing groove portions 15.

At least the introduction portion 13 and cover 24 of the housing 11 are made of acrylic resin, ABS (acrylonitrile-butadiene-styrene copolymer) resin, PC (polycarbonate) resin, PVC (polyvinyl chloride) resin, PE (polyethylene) resin, PEI (polyetherimide) resin, PBT (polyethylene terephtalate) resin or the like. Generally, these resins are harder than vinyl chloride for use in the covering portion 21. As for suitability of these resins for the introduction portion 13 and cover 24, the conductivity and conductive stability have been recognized to be practically available in all the resins. Further, if judging from viewpoints of appearance and insulation performance as well, particularly the PEI resin and PBT resin are suitable for this purpose.

If the waterproofing member 19 is formed of polyester elastomer, most preferably, the PBT resin is used for the introduction portions 13 and cover 24. This reason is that chemical structure of polyester elastomer is block copolymer of PBT and polyether, so that compatibility between the both can be obtained easily.

The waterproofing member 19 is made of resin (elastomer: material like synthetic rubber or synthetic plastic, which has such a characteristic that it is stretched double its initial length by a low stress and when the stress is released, returns to the initial length quickly) having a compatibility with the material of the covering portion 21. Resin having a compatibility with the covering portion 21 includes for example, (1) ABS/vinyl chloride alloy (acrylonitrile-butadiene-styrene copolymer/vinyl chloride), (2) acrylic/vinyl chloride alloy (acrylonitrile/vinyl chloride), (3) polyester elastomer and the like. Particularly, polyester elastomer or the like (e.g., block copolymer of polyethylene terephtalate and polyether) is most preferable.

The compatibility mentioned here means a degree of ease of agreeing with or in particular a characteristic that plastic material is equally mixed with polymer material. The compatibility is expressed by a limit value which does not cause phase separation when plastic material is added to polymer material.

When the introduction portion 13 and cover 24 are formed, the fusing portions 23, 27 are formed integrally with other portions than the fusing portions 23, 27 using different materials (aforementioned materials). The fusing portions 23, 27 are distinguished from the other portions by two colors.

Next, a waterproofing method for waterproofing the introduction portion 13 will be described.

First, the sheet-like terminal portion 16 of a terminal incorporated in the housing 11 is disposed in the waterproofing groove portion 15 of the introduction portion 13.

Next, the covered wire 17 having the annular waterproofing member 19 provided on the outside periphery thereof is inserted into the waterproofing groove portion 15 and at the connection portion 18, the terminal portion 16 is overlaid with the covered wire 17 so that the waterproofing member 19 and covered wire 17 are placed at the rear end of the waterproofing groove portion 15.

Next, the opening of the top of the waterproofing groove portion 15 is closed by the cover 24. At this time, the fusing portions 27 of the cover 24 are made into contact with the fusing portions 23 of the introduction portion 13. The connecting protrusions 28 are made into contact with the terminal portions 16 of the waterproofing groove portions 15 and upper portions of the connection portions 18 of the covered wires 17. Further, the waterproofing protrusions 29 are made into contact with upper portions of the waterproofing members 19 inserted in the waterproofing groove portions 15.

With this condition, the introduction portion 13 is subjected to ultrasonic vibration. By applying ultrasonic vibration to the introduction portion 13, the fusing portions 27 of the cover 24 and fusing portions 23 of the introduction portion 13 are melted so that they are fused with each other. Because the covering portion 21 of the connection portion 18 of the covered wire 17 is melted and removed, the covered wire 17 is pressed by the connecting protrusion 28, so that the conductors 20 (cores) of the covered wire 17 are conductively connected to the terminal portion 16. Further, the waterproofing member 19 is fused together with the covering portion 21 of the covered wire 17 so that they are integrated, and the waterproofing member 19 is fused with the inside wall 15*a* of the waterproofing groove portion 15 and further fused with the waterproofing protrusion 29 of the cover 24 as well.

According to the present embodiment, by Providing the outside periphery of the covered wire 17 with the annular waterproofing member 19 and applying ultrasonic vibration thereto, waterproofing of the introduction portion 13 can be achieved securely.

Further, because of the annular configuration of the waterproofing member 19, the waterproofing member 19 can be applied to only a requiring portion. Therefore waste use of the material is eliminated.

Further, because the annular waterproofing member 19 is finally melted, an inside diameter thereof can be determined regardless of the outside diameter of the covered wire 17. Therefore, the inside diameter of the waterproofing member 19 may be set relatively larger, so that this waterproofing member may be used regardless of the outside diameter of the covered wire. Thus, production cost thereof can be reduced.

Further, because the annular waterproofing member 19 can be moved easily along an axial direction of the covered wire 17, positioning thereof is easy so that the waterproofing can be carried out at any position on the covered wire.

Second Embodiment

Next, a second embodiment of the present invention will be described with reference to FIG. 4. In the first embodiment, the conductors 20 of the covered wire 17 are conductively connected to the terminal portion 16 in watertight condition by ultrasonic vibration. On the contrary, according to the second embodiment, an end of a covered wire 40 is connected to a terminal 39 by caulking.

Figure 4:
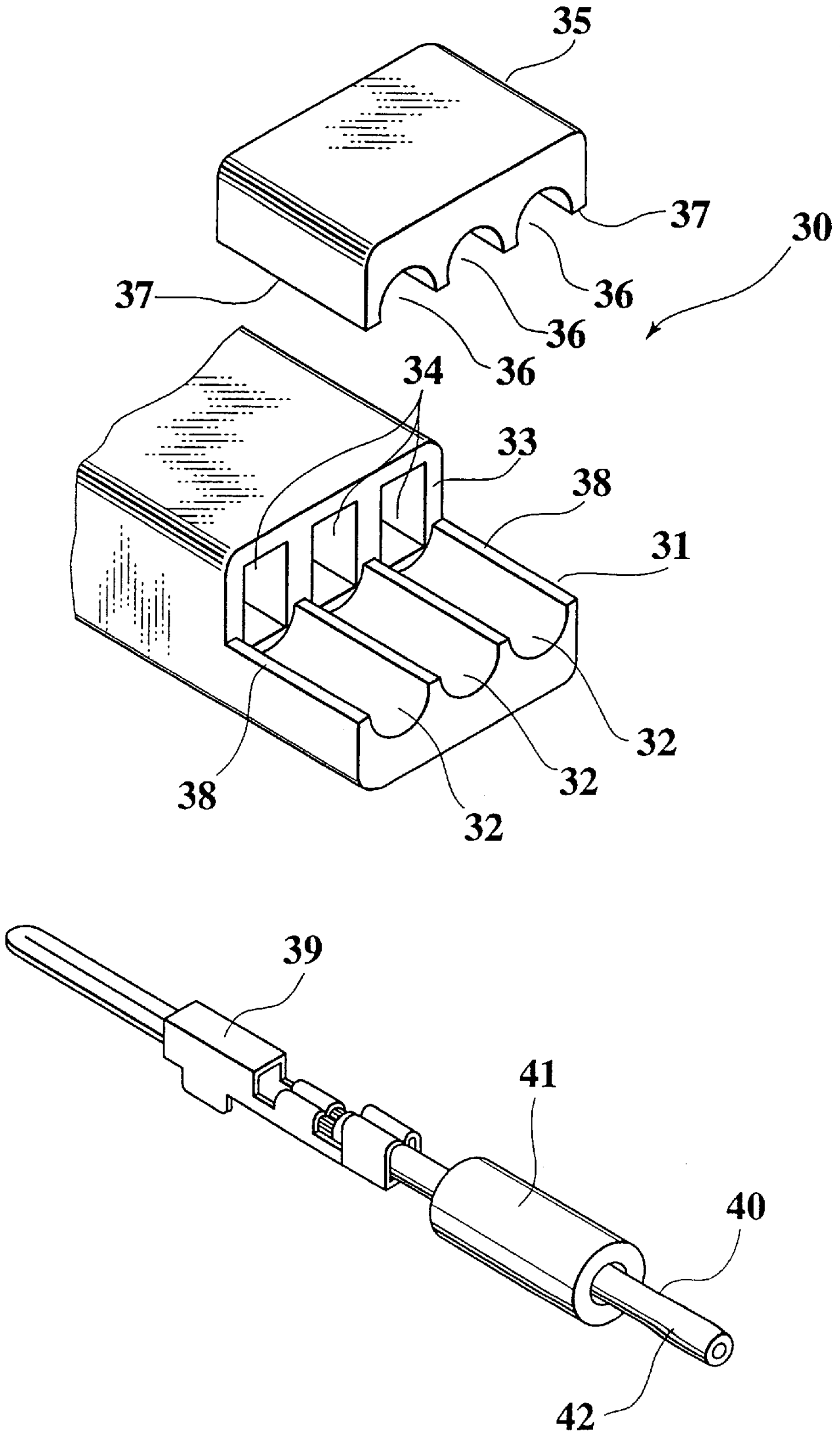
FIG. 4 is a disassembly perspective view of a connector according to a second embodiment.

As shown in FIG. 4, three waterproofing groove portions 32 having each circular cross section are formed in an introduction portion 31 of a connector 30. The waterproofing groove portions 32 correspond to terminal incorporating chambers 34 of a housing 33. On the other hand, in a cover 35 for closing the introduction portion 31 are formed three waterproofing groove portions 36 having each circular cross section. Fusing portions 37, 37 are formed on end faces of both sides of the cover 35. The fusing portions 37 are made into contact with fusing portions 38 of a top of the introduction portion 31.

After the terminal 39 is connected to the end of the covered wire 40 by caulking, an annular waterproofing member 41 is attached to the covered wire 40. With this condition, the terminal 39 is inserted into the terminal incorporating chamber 34 of the housing 33. Then, the waterproofing member 41 and covered wire 40 are placed on the waterproofing groove portion 32 of the introduction portion 31.

Next, the introduction portion 31 is closed by the cover. At this time, the fusing portions 37, 37 are made into contact with the fusing portions 38, 38 so that the waterproofing groove portions 36 is made into contact with the waterproofing members 41 .

When the introduction portion 31 is subjected to ultrasonic vibration, the fusing portions 37, 38 are melted and fused with each other. Further, the waterproofing member 41 and covering portion 42 are fused with each other so that they are integrated. As a result, the waterproofing member 41 is used with inside walls of the waterproofing groove portions 32, 36.

That is, according to the present embodiment, because the waterproofing member 41 and the covering portion of the covered wire 40 are melted together so that they are integrated in the introduction portion 31, water invasion between the waterproofing groove portions 32, 36 and covered wire 40 can be completely prevented, thereby ensuring a high waterproofing performance.

Further, according to the present embodiment, only by attaching the annular waterproofing member 41 to the outside periphery of the covered wire 40 and applying ultrasonic vibration, waterproofing can be achieved easily.

Third embodiment

Figure 5:
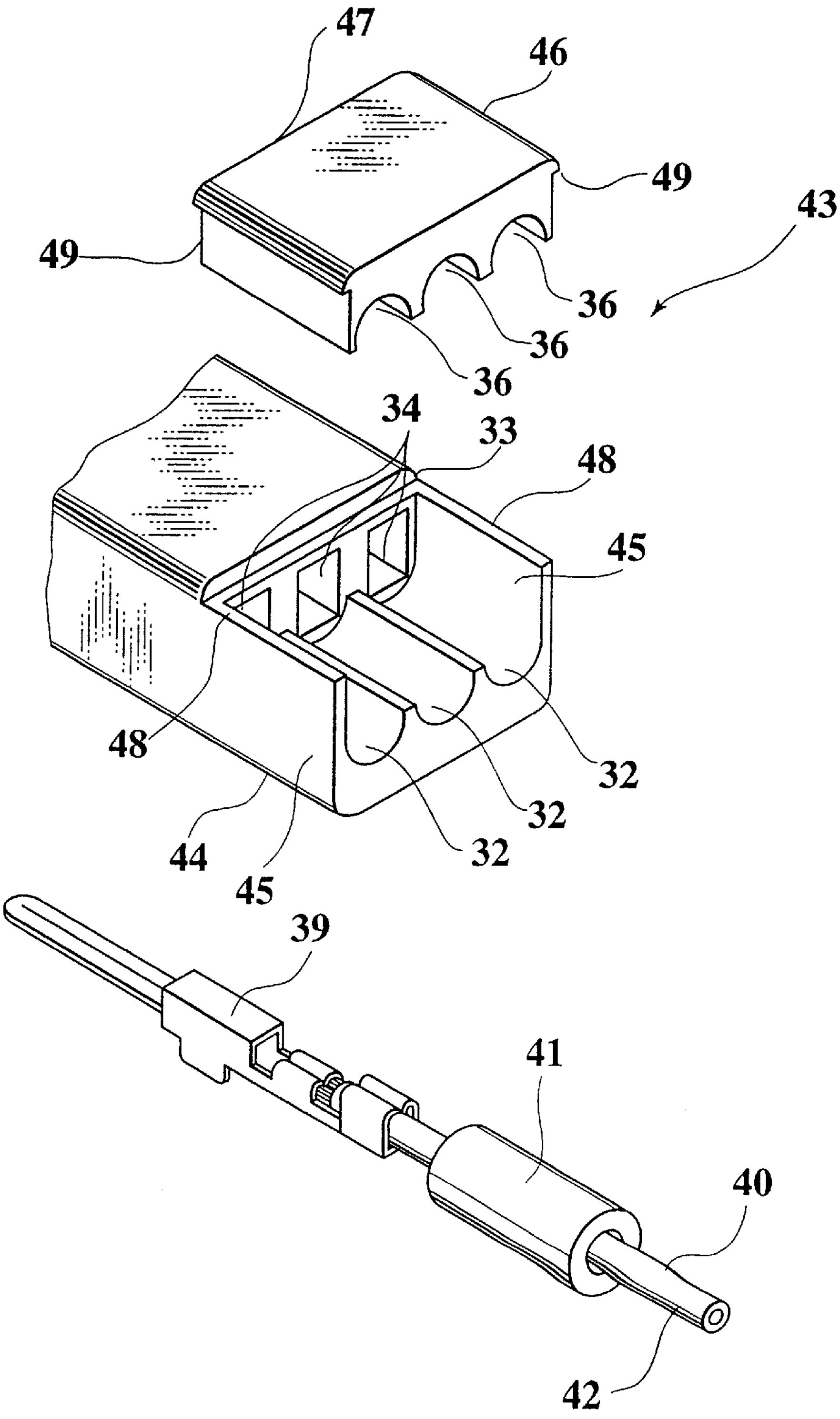
FIG. 5 is a disassembly perspective view of a connector according to a fourth embodiment.

Next, a third embodiment of the present invention will be described with reference to FIG. 5. This embodiment is a modification of the above described second embodiment. On both sides of an introduction portion 44 of a connector 43 are provided wall portions 45. A cover 46 is inserted between the wall portions 45 and 45. A contacting wall 47 which comes into contact with each top face of the wall portions 45, 45 is disposed across both ends of the cover 46. Fusing portions 48, 49 are formed on top faces of the wall portions 45, 45 and bottom faces of both sides of the contacting wall 47 respectively.

An annular waterproofing member 41 is attached to a covered wire 40 to which a terminal 39 is connected by caulking and the terminal 39 is inserted into a terminal incorporating chamber 34 of a housing 33. Then, the waterproofing member 41 and covered wire 40 are placed on a waterproofing groove portion 32 of the introduction portion 44.

Then, the introduction portion 44 is closed with a cover 46. At this time, the fusing portions 48 come into contact with the fusing portions 49 and a waterproofing groove portion 36 comes into contact with the waterproofing member 41.

Next, ultrasonic vibration is applied to the introduction portion 44. As a result, the fusing portions 48, 49 are melted and fused with each other and the waterproofing member 41 and covering portion 42 are melted together so that they are integrated. The waterproofing member 41 is fused with inside walls of the waterproofing groove portions 32, 36.

According to the present embodiment, the same effect as the second embodiment can be obtained. Further, because contacting area between both sides of the cover 46 and inside faces of the wall portions 45, 45 is additionally provided, the fusing area increases so that the cover 46 can be firmly fused to the introduction portion 44.

Fourth embodiment

Figure 7:
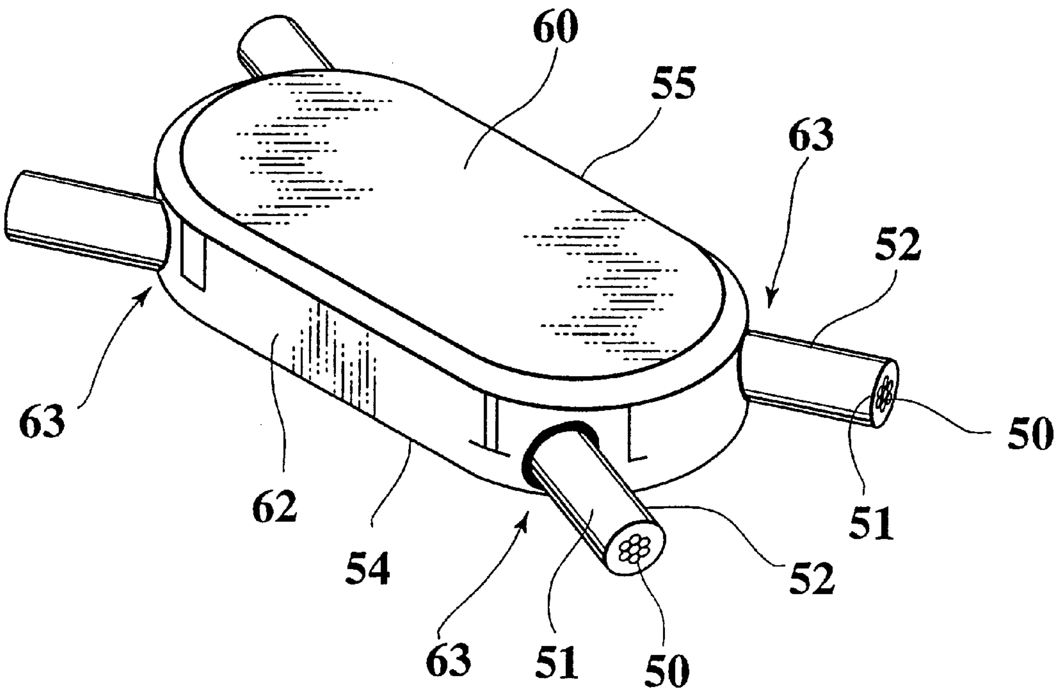
FIG. 7 is a perspective view showing a state in which the pair of the resin chips of the fifth embodiment are overlaid.
Figure 8:
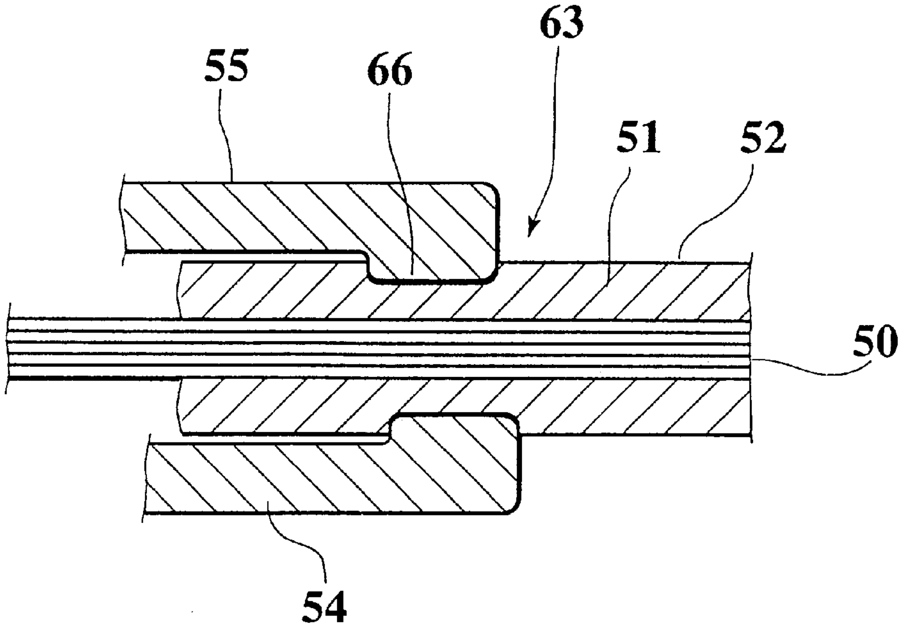
FIG. 8 is a sectional view showing an introduction portion according to the fifth embodiment.

Next, a fourth embodiment of the present invention will be described with reference to FIGS. 6–8. According to the present embodiment, the present invention is applied to a waterproofing structure in which covered wires are connected to each other and the connection portions of the covered wires are sealed in watertight condition.

Figure 6:
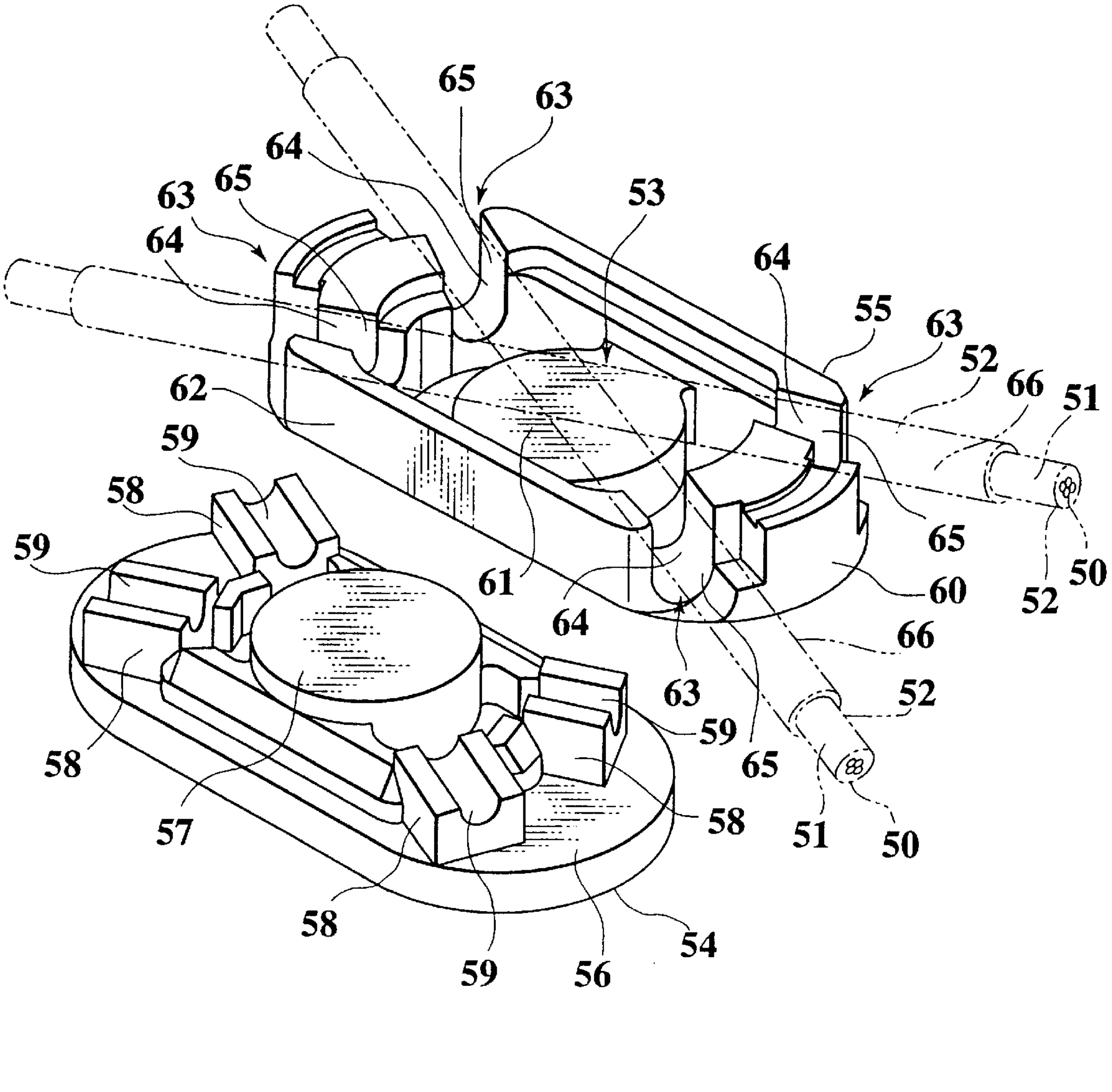
FIG. 6 is a perspective view of a pair of resin chips according to a fifth embodiment.

As shown in FIGS. 6, an outside periphery of a covered conductor 50 is covered with a covering portion 51 made of resin (vinyl chloride) so as to form a covered wire 52. Two covered wires 52 are pinched such that they are overlaid with each other at a connection portion 53 by a pair of resin chips 54, 55.

One resin chip 54 has a main fusing portion 57 which is formed in the center of an oval shaped main body 56 so as to protrude in a cylindrical shape. Auxiliary fusing portions 58, 58, 58, 58 are disposed at four positions around the main fusing portion 57 so that they project. In each of the auxiliary fusing portions 58, a concave wire incorporating groove 59 for incorporating the covered wire 52 is formed.

The other resin chip 55 has a main fusing portion 61 which is formed in the center of a main body 60 so as to protrude in a cylindrical shape. A side walls 62 is disposed around the main body 60 so as to surround the main fusing portion 61. Four openings are provided in the side wall 62. Inside each of the openings, introduction portions 63, 63, 63, 63 are disposed for introducing each of the covered wires 52, 52 from the pair of the resin chips 54, 55. On each of the introduction portions 63, auxiliary fusing portions 64, 64, 64, 64 are provided. Each auxiliary fusing portion 64 has a wire incorporating groove 65 for incorporating the covered wire 52 and is formed in a convex shape allowing the auxiliary fusing portion 58 of another resin chip 54 to be fit thereto.

Waterproofing members 66, 66 are attached to the outside periphery of two covered wires 52, 52 and then the two covered wires 52, 52 are pinched such that they intersect each other at the connection portion 53 between the main fusing portions 57 and 61 by the pair of the resin chips 54, 55. In this case, the length of the annular waterproofing member 66 is set to a length from one auxiliary fusing portion 64 up to another auxiliary fusing portion 64 on an opposite side across the main fusing portion 61. Thus, the connection portion 53 of the covered wires 52, 52 as well as the annular waterproofing members 66, 66 are pinched between the main fusing portions 61 and 57. Further, the covered wires 52, 52 as well as the annular waterproofing members 66, 66 are pinched also between the auxiliary fusing portions 58, 58 at the four positions.

In the resin chips 54, 55, the main fusing portions 57, 61 are made of acrylic resin, ABS (acrylonitrile-butadiene-styrene copolymer) resin, PC (polycarbonate) resin, PVC (polyvinyl chloride) resin, PE (polyethylene) resin, PEI (polyetherimide) resin, PBT (polyethylene terephtalate) resin or the like. Generally, these resins are harder than vinyl chloride or the like for use in the covering portion 51. As for suitability of these resins for the resin chips 54, 55, the conductivity and conductive stability have been recognized to be practically available in all the resins. Further, if judging from viewpoints of appearance and insulation performance as well, particularly the PEI resin and PBT resin are suitable for this purpose.

If the waterproofing member 66 is formed of polyester elastomer, most preferably, the PBT resin is used for the auxiliary fusing portions 58, 64. This reason is that chemical structure of polyester elastomer is block copolymer of PBT and polyether, so that compatibility between the both can be obtained easily.

The auxiliary fusing portions 58, 64 are made of resin (elastomer: material like synthetic rubber or synthetic plastic, which has such a characteristic that it is stretched double its initial length by a low stress and when the stress is released, returns to the initial length quickly) having a compatibility with the material of the covering portion 51. Resin having a compatibility with the covering portion 51 includes for example, (1) ABS/vinyl chloride alloy (acrylonitrile-butadiene-styrene copolymer/vinyl chloride), (2) acrylic/vinyl chloride alloy (acrylonitrile/vinyl chloride), (3) polyester elastomer and the like. Particularly, poly ester elastomer or the like (e.g., block copolymer of polyethylene terephtalate and polyether) is most preferable.

The compatibility mentioned here means a degree of ease of agreeing with or in particular a characteristic that plastic material is equally mixed with polymer material. The compatibility is expressed by a limit value which does not cause phase separation when plastic material is added to polymer material.

When the resin chips 54, 55 are formed, the main fusing portions 57, 61 and portions except the main fusing portions 57, 61 including the auxiliary fusing portions 58, 64 are formed integrally by different materials (above mentioned materials). The main fusing portions 57, 61 and the other portions except the main fusing portions 57, 61 including the auxiliary fusing portions 58, 64 are distinguished in two colors.

Next, a waterproofing method for waterproofing the connection portion 53 of the covered wires 52, 52 by the pair of the resin chips 54, 55 will be described.

First, the waterproofing members 66, 66 are attached to the outside periphery of the two covered wires 52, 52 and then the two covered wires 52, 52 are crossed on the main fusing portion 61. Then, the covered wires 52, 52 are inserted together with the waterproofing members 66, 66 into the auxiliary fusing portions 64, 64, 64, 64.

Next, one resin chip 54 is placed on the other resin chip 55. At this time, the connection portion 53 of the covered wires 52, 52 is pinched together with the annular waterproofing members 66, 66 between the main fusing portions 61 and 57. Further, the covered wires 52, 52 at the introduction portions 63 are pinched together with each of the annular waterproofing members 66 between the auxiliary fusing portions 64, 64, 64, 64 and auxiliary fusing portions 58, 58, 58, 58.

By applying ultrasonic vibration to the pair of the resin chips 54, 55 with this condition, the covering portions 51, 51 are melted and removed between the main fusing portions 61 and 57 so that the conductors are conductively connected to each other and then the main fusing portions 57, 61 are fused with the waterproofing members 66. Further, between the auxiliary fusing portions 58, 58, 58, 58 and auxiliary fusing portions 64, 64, 64, 64, the waterproofing members 66 are melted together with the covering portions 51 so that they are integrated. That is, the auxiliary fusing portions 58, 64 and waterproofing member 66 are fused with each other.

As a result, the connection portion 53 in which the covered wires 52, 52 are overlaid can be sealed.

Although in the above described respective embodiments, the introduction portions are heated by ultrasonic vibration, it is permissible to heat them by other heating method so as to fuse the waterproofing portion with the covering portion and the introduction portion with the waterproofing member.

Further, although in the above described respective embodiments, the covered wire is used as the covered conductor, the present invention may be applied to other covered conductor, for example, FPC and the like.

What is claimed is:

1. A waterproofing method for waterproofing an introduction portion of a covered conductor, the covered conductor having a conductor and a covering portion made of resin for covering an outside periphery of the conductor, the covered conductor being introduced from the introduction portion of resin molded product, the waterproofing method comprising the steps of:

attaching an annular waterproofing member to an outside periphery of the covering portion at the introduction portion, the waterproofing member being capable of being fused together with the introduction portion and having a compatibility with the covering portion; and heating the introduction portion so that the heated waterproofing member and the covering portion are melted together and then the waterproofing member and the introduction portions are fused together with each other.

2. A waterproofing method according to claim 1, wherein the covered conductor is a covered wire;

the resin molded product is a resin connector comprising a cover and a housing;

the housing has the introduction portion containing the waterproofing groove portion in which the waterproofing member and the covered wire are to be inserted;

the cover has a waterproofing protrusion for covering the waterproofing groove portion and pressing the waterproofing member in the waterproofing groove portion; and the introduction portion is subjected to ultrasonic vibration with the waterproofing groove portion being covered with the cover, so that the waterproofing member and covering portion are melted together and then the waterproofing member and an inside wall of the waterproofing groove portion are fused together with each other.

3. A waterproofing method according to claim 2, wherein the connector incorporates a terminal having a sheet-like terminal portion;

the covered wire is accommodated in the waterproofing groove portion such that the covered wire is overlaid with the terminal portion at the connection portion;

the cover has a connecting protrusion;

the connecting protrusion press the connection portion when the waterproofing groove portion is covered with the cover; and the covering portion of the covered wire is melted and removed at the connection portion when the introduction portion is subjected to ultrasonic vibration so that the terminal portion is conductively connected to the conductor.

4. A waterproofing method according to claim 1, wherein the covered conductor comprised two covered wires;

the resin molded product comprises a pair of resin chips for pinching the covered wires such that they are overlaid at the connection portion, each of the resin chips having the introduction portions for introducing the covered wires;

each of the resin chips having a main fusing portion which is fused with a mating resin chip across the connection portion so as to seal the connection portion and auxiliary fusing portions which are provided on each of the introduction portions and subjected to ultrasonic vibration so as to be fused together with the covering portion of the covered wire introduced from the main fusing portion; and the covering portion is melted and removed so that the covered wires are conductively connected to each other by applying a pressure outside the resin chips when the connection portion is subjected to ultrasonic vibration while being pinched by the pair of the resin chips.

5. A waterproofing method according to claim 4, wherein each of the auxiliary fusing portions of one of the resin chips is formed in a convex form having a wire accommodating groove for accommodating each of the covered wires;

each of the auxiliary fusing portions of the other of the resin chips is formed in a concave form which has a wire accommodating groove for accommodating each of the covered wires and is fit to each of the auxiliary fusing portions of the one resin chip; and the waterproofing member and covered wire are pinched between the auxiliary fusing portions of the one and the other resin chips.

* * * * *

UNITED STATES PATENT AND TRADEMARK OFFICE

CERTIFICATE OF CORRECTION

PATENT NO. : 6,027,589
DATED : February 22, 2000
INVENTOR(S) : Kato et al.

It is certified that error appears in the above-identified patent and that said Letters Patent is hereby corrected as shown below:

Claim 3, Column 11,
Line 7, "press" should read -- presses --.

Claim 4, Column 11,
Line 17, "comprised" should read -- comprises --.

Signed and Sealed this

Twenty-eighth Day of August, 2001

*Attest:*

Nicholas P. Godici

NICHOLAS P. GODICI

*Attesting Officer*

*Acting Director of the United States Patent and Trademark Office*